United States Patent [19]
Galvanauskas et al.

[11] Patent Number: 5,867,304
[45] Date of Patent: Feb. 2, 1999

[54] USE OF APERIODIC QUASI-PHASE-MATCHED GRATINGS IN ULTRASHORT PULSE SOURCES

[75] Inventors: Almantas Galvanauskas, Ann Arbor, Mich.; Mark A. Arbore, Palo Alto; Martin M. Fejer, Menlo Park, both of Calif.; Donald J. Harter, Ann Arbor, Mich.

[73] Assignee: IMRA America, Inc., Ann Arbor, Mich.

[21] Appl. No.: 845,410

[22] Filed: Apr. 25, 1997

[51] Int. Cl.$^6$ ........................................ H01S 3/00
[52] U.S. Cl. ............................ 359/333; 359/25; 359/102
[58] Field of Search .................................. 372/20, 21, 25, 372/102; 359/333

[56] References Cited

U.S. PATENT DOCUMENTS

| | | | |
|---|---|---|---|
| 5,499,134 | 3/1996 | Galvanauskas et al. | 359/333 |
| 5,640,405 | 6/1997 | Wallace et al. | 372/21 |
| 5,644,584 | 7/1997 | Nam et al. | 372/20 |
| 5,696,782 | 12/1997 | Harter et al. | 372/25 |

OTHER PUBLICATIONS

M.M.Fejer, G.A.Magel, D.H.Jundt, and R.L.Byer, "Quasi-Phase–Matched Second Harmonic Generation: Tuning and Tolerance", IEEE J. of Quantum Electron. QE–28 2631 (Nov. 1992).

T.Suhara and H.Nishihara, "Theoretical Analysis of Waveguide Second–Harmonic Generation Phase Matched with Uniform and Chirped Gratings", IEEE J. of Quantum. Electron. QE–26, 1265 (Jul. 1990).

M.A.Arbore, and M.M. Fejer, U.S. Patent Application No. 08/_, "Aperiodic Quasi–Phase–Matching Grating for Chirp Adjustment and Frequency Conversion of Ultrashort Pulses" filed Apr. 25, 1997.

D.Strickland and G.Mourou, "Compression of Amplified Chirped Optical Pulses", Opt. Commun. 56, pp. 219–222 (Dec. 1985).

B.E. Lemoff, and C.P. Barty, "Quintic–Phase–Limited, Spatially Uniform Expansion and Recompression of Ultrashort Optical Pulses", Opt. Lett 18, 1651 (Apr. 1993).

S.Kane, and J.Squier, "Grating Compensation of Third-d–Order Material Dispersion in the Normal Dispersion Regime: Sub–100–fs Chirped–Pulse Amplification Using a Fiber Stretcher and Grating–Pair Compressor" IEEE J. of Quantum electron. QE–31, 2052 (Nov. 1995).

L.E.Nelson, S.B.Fleischer, G.Lenz, and E.P.Ippen, "Efficient Frequency Doubling of a Femtosecond Fiber Laser", Opt. Lett., vol. 21, No. 21, 1759 (Nov. 1996).

A.M.Weiner, D.E.Leaird, J.S.Patel, and J.R.Wullert, "Programmable Femtosecond Pulse Shaping by Use of a Multielment Liquid–Crystal Phase Modulator", Opt. Lett., vol. 15, No. 6, 326 (Mar. 1990).

C.Spielmann, F.Krausz, T.Brabec, E.Wintner and A.J.Schmidt, "Experimental Strudy of Additive–Pulse Mode Locking in an Nd: Glass Laser", IEEE J of Quantum electron. vol. 27, No. 5, 1207 (May 1991).

*Primary Examiner*—Mark Hellner
*Attorney, Agent, or Firm*—Sughrue, Mion, Zinn, Macpeak & Seas, PLLC

[57] ABSTRACT

A chirped pulse amplification system employs chirped quasi-phase-matched (QPM) gratings as dispersive delay lines for stretching and/or compressing ultrashort pulses. QPM gratings with periods varying along the beam propagation direction produce simultaneous second-harmonic generation and, in general, both amplitude and phase modulation of this second harmonic output. The aperiodic QPM gratings are designed to provide stretching or compression of the output second harmonic pulse with respect to the fundamental-wavelength input pulse. The chirped QPM gratings are also used for simultaneous harmonic generation and compressing of the chirped output from a femtosecond laser oscillator. In general, the aperiodic QPM gratings can be used to efficiently produce arbitrarily shaped second-harmonic pulses.

46 Claims, 5 Drawing Sheets

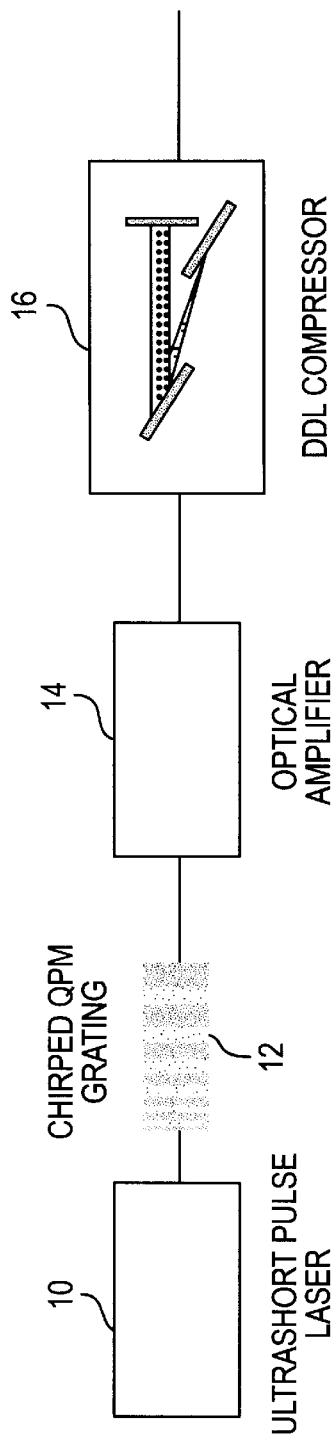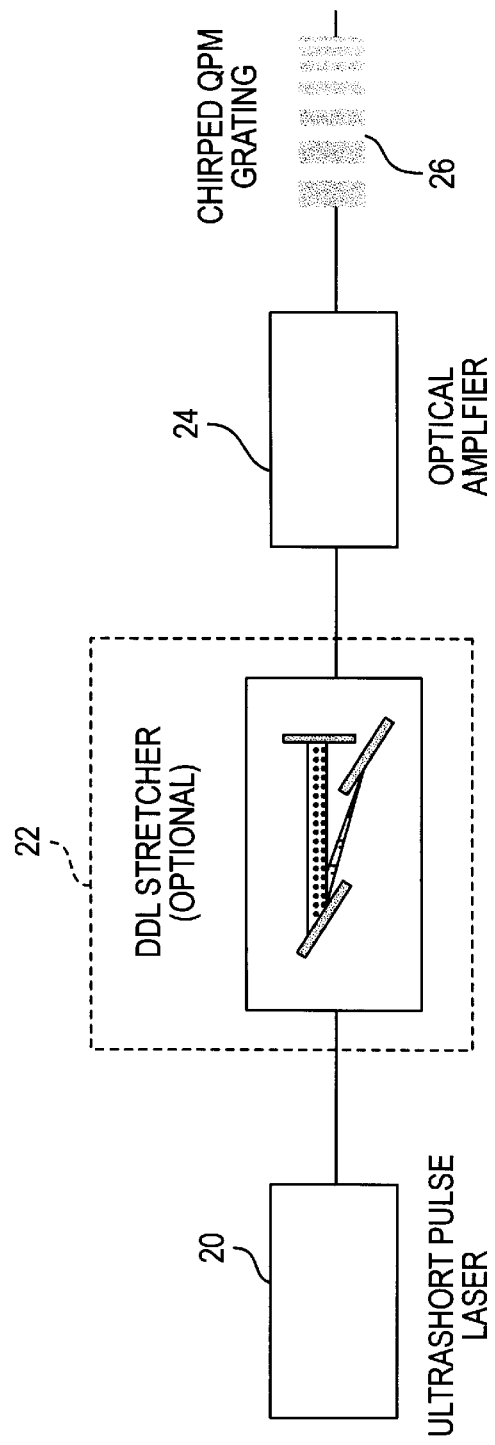

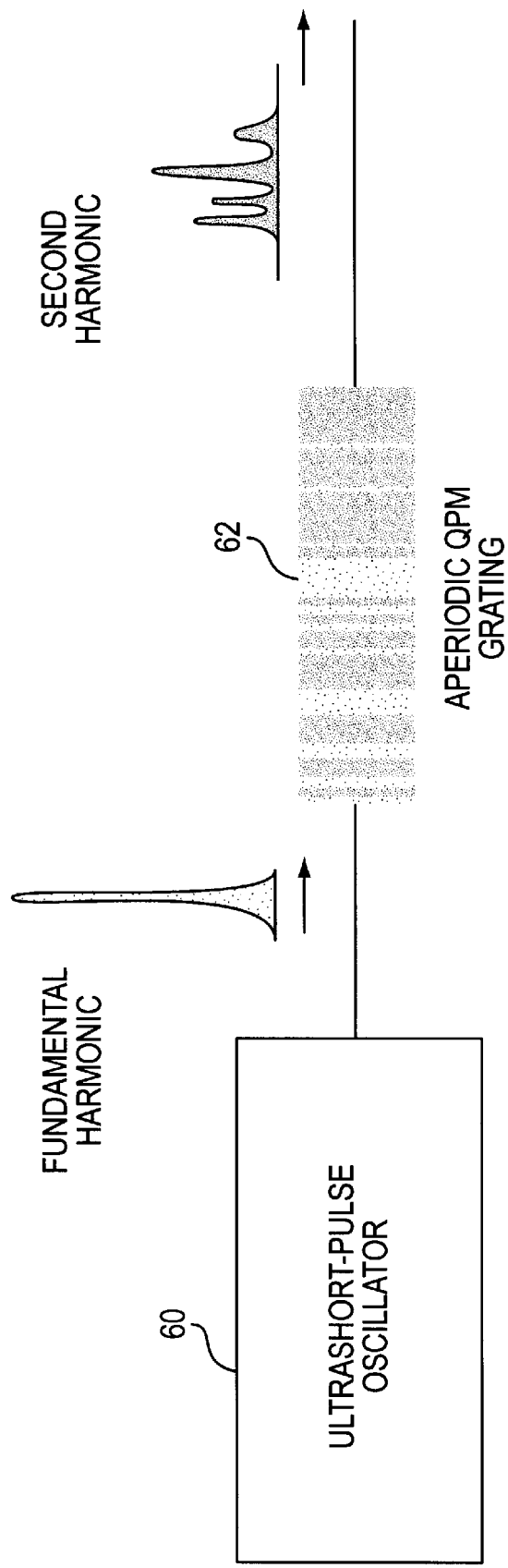

USE OF APERIODIC QUASI-PHASE-MATCHED GRATINGS IN ULTRASHORT PULSE SOURCES

This invention was supported in part directly by ARPA under grant number MDA972-94-1-0003 and by ARPA through the Center for Nonlinear Optical Materials under grant number ONR-N00014-92-J-1903. The Government has certain rights in the invention.

BACKGROUND OF THE INVENTION

1. Field of the Invention

The present invention relates to the use of chirped (aperiodic) quasi-phase-matched (QPM) gratings as dispersive components in ultrashort-pulse laser systems.

2. Description of the Related Art

Chirped pulse amplification (CPA) systems are well known in the field of ultrafast optics. See, for example, D. Strickland et al., *Compression of Amplified Chirped Optical Pulses*, Opt. Commun. Vol. 56, pp. 219 (1985). CPA techniques are used to stretch ultrashort optical pulses prior to amplification when it is necessary to reduce the unacceptably-high pulse peak powers in the amplifier material or optical components in order to avoid detrimental effects. The ultrashort pulse duration must be restored after amplification using a pulse compressor.

Pulse stretching and compression can be achieved by introducing dispersion. Group velocity dispersion (GVD) of an optical pulse arises from the difference in the group velocities for different spectral components constituting the pulse. An optical element producing this dispersion is called a dispersive delay line (DDL). A variety of dispersive delay lines are known in the prior art associated with the field of ultrashort pulse optics, where they are commonly used for ultrashort pulse stretching and compression. Optical pulses are generally considered to be ultrashort if their duration is in the range from approximately $10^{-15}$ to $10^{-}$ seconds.

Conventional dispersive delay lines include: diffractive (diffraction grating based), refractive (using prisms or other refractive shapes), interferometric (using Gires-Tournois or Fabry-Perot etalons), and Bragg reflection (fiber gratings, chirped mirrors) DDLs. All of the previously known CPA systems use conventional dispersive delay lines for stretching and recompression, and all of the conventional DDLs produce dispersed output pulses at the same wavelength as the input pulses.

Diffraction gratings can provide a large amount of stretching and compression and possess a broad spectral bandwidth. However, diffractive DDLs are disadvantageous because they are typically large in size, consist of multiple components, require complicated alignment procedures and induce relatively high losses on the dispersed optical pulse. Additionally, diffractive DDLs provide a limited degree of control of the linearity of the GVD characteristics.

Refractive DDLs are advantageous because of their low loss. However, refractive DDLs provide only a small amount of stretching/compression, are relatively large in size and provide only limited control of the linearity of the dispersion characteristics.

Interferometric DDLs are compact and have low loss. However, the practical use of interferometric DDLs is very limited due to the small bandwidth and the small amount of dispersion they provide.

Advantages of Bragg reflection DDLs, such as fiber gratings, include their small size, large dispersion, large bandwidth, and arbitrary control of dispersion characteristics. The primary disadvantages of fiber gratings are the limitations on the recompressed pulse energy and insertion losses due to the reflective configuration of such DDLs. Chirped mirrors, on the other hand, have a substantially higher energy threshold for pulse distortions, but provide a very small amount of dispersion.

It is known in the prior art that unmatched, higher-order dispersion terms can arise either if the pulse stretcher and pulse compressor are different types of DDLs or if the large amount of linear GVD introduced by the material in an optical path of propagating pulses causes a dispersion mismatch between pulse stretchers and compressors of the same type. See, for example, B. E. Lemoff et al., *Quintic-phase-limited, spatially uniform expansion and recompression of ultrashort optical pulses*, Opt. Lett., Vol. 18, pp. 1651 (1993); S. Kane et al., *Grating Compression of Third-Order Material Dispersion in the Normal Dispersion Regime: Sub-100-fs Chirped-Pulse Amplification Using a Fiber Stretcher and Grating-Pair Compressor*, IEEE J. of Quantum Electron. QE-31, pp. 2052 (1995).

In general, use of DDLs for commercially viable ultrashort pulse lasers, amplifiers and pulse shapers requires improvement of certain characteristics of existing DDLs, such as compactness, manufacturability, cost, amount of loss, and ability to control the linearity of dispersion characteristics, while maintaining the key properties of large dispersion capability, large spectral bandwidth, and the capability to sustain high pulse energies. As the above description of the properties of conventional DDLs reveals, there generally exists a trade-off between the properties of any conventional DDL. Therefore, a novel device capable of providing all of the required properties in one element would be highly beneficial.

In general, solid-state mode-locked lasers operating in a chirped pulse mode are capable of obtaining higher pulse energies. An example of a solid-state laser producing increased pulse energies for chirped output is disclosed by C. Spielmann et al. in *Experimental study of additive-pulse mode-locking in an ND:glass laser*, IEEE J. of Quantum Electron., Vol. 27, pp. 1207 (1991).

Another example of using a dispersive delay line in an ultrafast laser system is disclosed by L. E. Nelson et al. in *Efficient frequency doubling of a femtosecond fiber laser*, Opt. Lett., Vol. 21, pp. 1759 (1996), where a refractive prism-based compressor is used to compress chirped pulses from a stretched-pulse additive-pulse mode-locked fiber laser prior to frequency doubling of these compressed pulses in a conventional birefringence phase-matched nonlinear crystal. Such a fiber laser can generate pulses with energies that are approximately an order of magnitude higher than those from a typical mode-locked fiber laser directly producing bandwidth-limited pulses. However, the necessary external compressor substantially increases the complexity and size of the laser system.

A dispersive delay line in an ultrafast system can be used not only for pulse stretching or compression but also for arbitrary pulse shaping, as often required for various applications in chemistry, optical communications, etc. One example of such an arrangement is disclosed by A. Weiner et al. in *Programmable femtosecond pulse shaping by use of a multielement liquid-crystal phase modulator*, Opt. Lett., Vol. 15, pp. 326 (1990). In such an apparatus, the pulse to be shaped is spectrally and spatially dispersed using, for example, a grating pair or a pair of prisms. The spectrum is propagated through a spacial mask which spectrally filters both the amplitude and phase of the pulse. The spectral components are then recollimated into a beam by a second grating or pair of prisms forming a reshaped optical pulse. In principle, by a proper choice of spectral mask, any required optical waveform can be generated. The main disadvantage of this method is that the apparatus is a complex system with relatively large dimensions.

Methods of quasi-phase-matching offer broad engineerability to the phasematching properties of frequency conversion devices but have, to date, almost exclusively been applied only with periodic gratings. See, for example, M. Fejer et al., *Quasi-Phase-Matched Second Harmonic Generation: Tuning and Tolerances*, IEEE J. of Quantum Electron. QE-28, 2631 (1992). Such use of periodic QPM has allowed interactions in wavelength ranges and use of large nonlinear coefficients not available with birefringence phasematching. While aperiodic QPM gratings were suggested by T. Suhara et al. in *Theoretical Analysis of Waveguide Second-Harmonic Generation Phase Matched with Uniform and Chirped Gratings*, IEEE J. of Quantum. Electron. QE-26, 1265 (1990) for the additional advantage of increasing the wavelength acceptance bandwidth in continuous-wave second harmonic generation, the important implications of the phase response of these aperiodic QPM structures to ultrashort-pulse frequency conversion have not been known or used in practice.

In U.S. patent application Ser. No. 08/824,032, Arbore et al. disclose that a quasi-phase-matched (QPM) second harmonic generator (SHG) with QPM period chirped along the crystal length, in effect, provides group velocity dispersion (GVD) at the second-harmonic wavelength. This property allows construction of unique devices for simultaneous second-harmonic generation and temporal stretching or compression of the second-harmonic output with respect to the fundamental input pulses.

The properties of this type of dispersive element provide a number of advantages over conventional dispersive delay lines. Aperiodic QPM gratings combine compact size, manufacturability and low cost, monolithic design. Further, aperiodic QPM gratings have low loss at the fundamental wavelength, and pulse energies can be scaled by scaling the beam size. Also, such QPM gratings allow nearly arbitrary control of dispersion characteristics. In addition, aperiodic QPM gratings possess the unique property of simultaneously performing SHG and pulse compression in a single device.

All of the above-mentioned articles, patents and patent applications are hereby incorporated herein by reference.

SUMMARY OF THE INVENTION

It is a general object of the present invention to substantially improve a variety of performance characteristics of ultrashort pulse systems. Desirable performance improvements include reduction in size, design complexity and losses, higher efficiency, broader spectral bandwidth and greater control of dispersion characteristics, relative to conventional dispersive delay lines used in ultrashort pulse systems.

It is another object of the present invention to provide means for efficient second harmonic generation with a pulsed laser source by combining the functions of a dispersive delay line and a harmonic generator into a single device.

It is a further object of the present invention to provide means to generate arbitrarily shaped optical pulses using aperiodic QPM gratings.

The present invention achieves these objectives by employing aperiodic (chirped) QPM gratings as dispersive elements in ultrashort pulse systems. According to one aspect of the present invention, chirped QPM gratings are used as stretchers and/or compressors in chirped pulse amplification systems. When used in CPA systems in this manner, chirped QPM gratings provide a substantial reduction in the number of components, reduce the size of the system, and increase system robustness. These improvements cumulatively result in considerably simplified manufacturing, as well as reduced cost and increased reliability of such devices, relative to CPA systems based on conventional dispersive delay lines. A further advantage of using chirped QPM gratings in CPA systems is the capability of tailoring the dispersion characteristics of a QPM grating to correct for first and higher order GVD terms.

According to another aspect of the present invention, a chirped QPM grating is used to simultaneously compress and frequency double stretched (chirped) optical pulses output directly from an ultrashort-pulse oscillator, such as a mode-locked oscillator. Use of a chirped QPM grating in this manner eliminates the need for bulk arrangements and substantially increases the efficiency of the pulse compression and frequency conversion.

According to another aspect of the present invention, an aperiodic QPM grating can be employed to arbitrarily shape ultrashort optical pulses at the second-harmonic wavelength. Use of a chirped QPM grating for pulse shaping advantageously provides a compact and monolithic design.

These and other objects and features of the present invention will be apparent from the following detailed description of the preferred embodiments and the accompanying drawings.

BRIEF DESCRIPTION OF THE DRAWINGS

FIG. 2a is a diagrammatic view of an ultrashort-pulse chirped pulse amplification system including a pulse stretcher comprising a chirped QPM grating.

FIG. 2b is a diagrammatic view of an ultrashort-pulse chirped pulse amplification system including a pulse compressor comprising a chirped QPM grating.

FIG. 4 is a diagrammatic view of an ultrashort pulse generating system comprising an ultrashort-pulse oscillator and an aperiodic QPM grating providing arbitrarily-shaped ultrashort optical pulses.

DETAILED DESCRIPTION OF THE PREFERRED EMBODIMENTS

The effect of second harmonic generation (SHG) in an aperiodic QPM grating can be described mathematically. For undepleted-pump plane-wave approximation and under conditions where intra-pulse group velocity dispersion (GVD) can be neglected, the generated SH pulse is described in the frequency domain by a simple transfer function relation:

$$\hat{A}_2(\Omega) = \hat{D}(\Omega) \cdot \hat{A}_1^2(\Omega) \quad (1)$$

where $\Omega = \omega - \omega_0$ is the detuning of the angular frequency from the spectral center of the pulse, $\hat{A}_2(\Omega)$ is the Fourier transform of the second harmonic pulse, $\hat{A}_1^2(\Omega)$ is the Fourier transform of the square of the fundamental pulse, $\hat{D}(\Omega)$ is a QPM-grating transfer function related to the tuning curve for continuous-wave SHG. In this relation, the Fourier transform of the square of the fundamental pulse $\hat{A}_1^2(\Omega)$ describes pulse shape and phase changes due to the second-harmonic conversion itself. Amplitude and phase changes due to the properties of a QPM grating are described by the QPM-grating transfer function $\hat{D}(\Omega)$. In the above-mentioned U.S. patent application Ser. No. 08/824,032, Arbore et al. disclose that, for a linearly chirped QPM grating, this transfer function essentially has the form $\hat{D}(\Omega) \propto \exp(i\Omega^2 \delta^2 / 4D_{g2})$. This indicates that such chirped QPM material is acting on the phase of a generated second-harmonic signal, in effect, equivalently to a group-velocity dispersion (GVD) of $\delta^2 / 2D_{g2}$ relative to the fundamental pulse. Here, $\delta = v_{g1}^{-1} - v_{g2}^{-1}$ is a parameter for group velocity mismatch (GVM) between the fundamental and second harmonic pulses ($V_{g1}$ and $V_{g2}$ are the group velocities at the fundamental and second harmonic wavelengths, respectively). $D_{g2}$ determines the chirp rate of the QPM grating and, for linear chirp, is related to the variation of the QPM period $\Lambda(z)$ through:

$$D_{g2} = -\frac{\pi}{\Lambda^2(z_0)} \left. \frac{d\Lambda(z)}{dz} \right|_{z=z_0} \quad (2)$$

Here, $z_0$ corresponds to the longitudinal coordinate at the center of the QPM grating.

The QPM grating itself does not directly induce any real GVD for either fundamental or second harmonic pulses. It is only through the process of the second-harmonic generation that the effective GVD appears. This effective dispersion is a result of the interplay between two phenomena: group velocity mismatch (GVM) between the fundamental and second harmonic pulses, intrinsic to the nonlinear material; and spatial localization of second harmonic conversion of a particular frequency component, a property of aperiodic QPM gratings. To be more particular about this feature of aperiodic QPM gratings, one can refer to it as to a quasi-dispersion.

Figure 1:
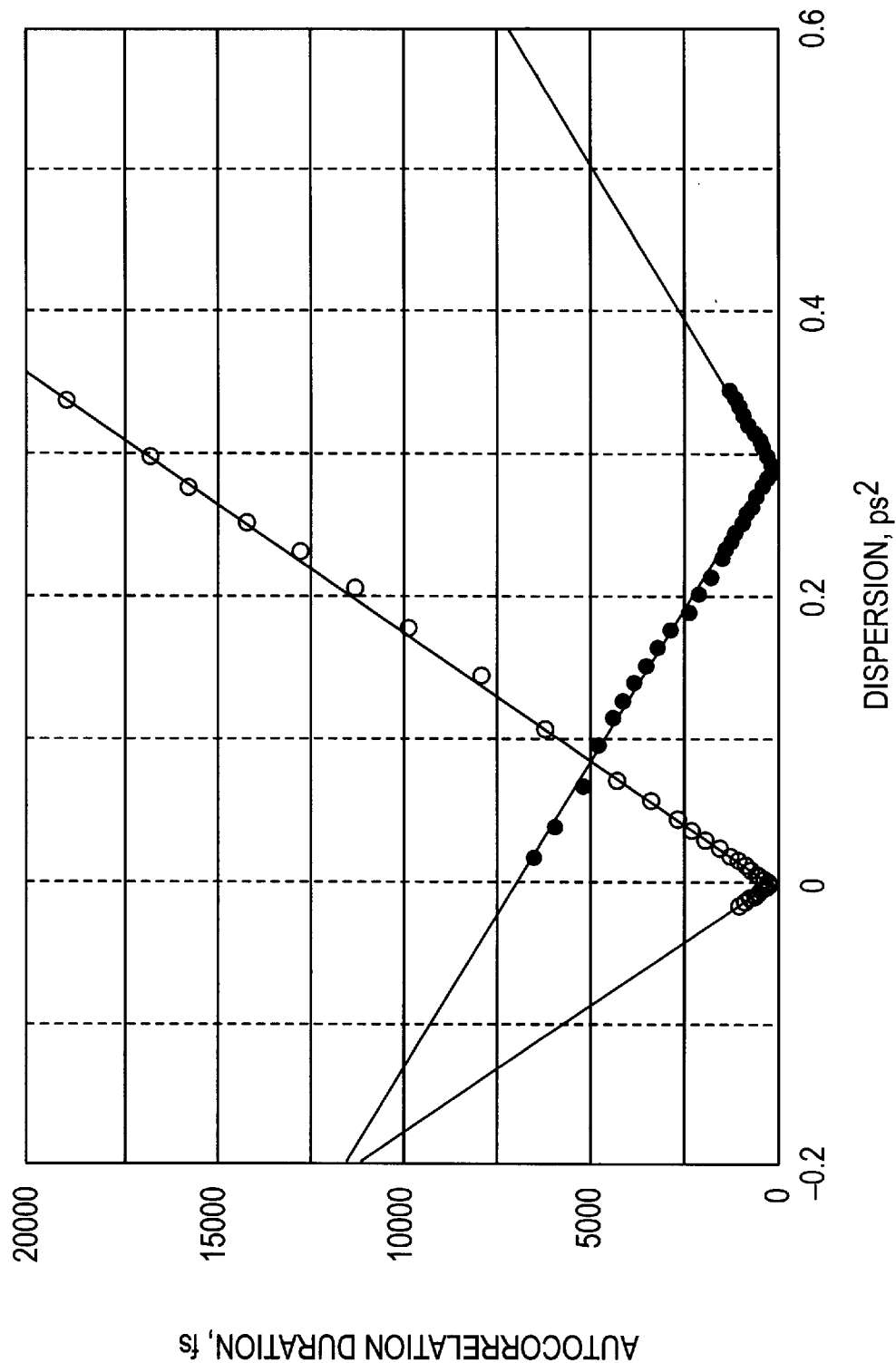
FIG. 1 is a graph illustrating experimentally measured dispersion characteristics of a linearly chirped QPM grating.

Experimentally measured dispersion characteristics of a linearly chirped QPM grating are shown in FIG. 1. In this plot, the measured autocorrelation trace durations of the output second harmonic pulses (solid circles) and the input fundamental pulses (open circles) are shown as a function of an external dispersion induced by a conventional dispersive delay line (diffraction-grating stretcher) on the fundamental input pulse. The shift between the position of the minimum duration for second harmonic and fundamental pulses is caused by the effective GVD of a QPM grating. The measured effective dispersion at 780 nm is 0.146 ps$^2$ (0.293 ps$^2$ at 1560 nm). A linearly chirped QPM grating was implemented in a 5 cm long periodically poled lithium niobate (PPLN) crystal with QPM periods varying linearly from 18.2 to 19.8 $\mu$m along the sample. The chirped PPLN crystal should provide ~0.161 ps$^2$ effective dispersion at the second-harmonic wavelength (~0.323 ps$^2$ for fundamental); both values are close to those experimentally measured. The second-harmonic pulses were compressed by ~150 times from initial 15 ps stretched fundamental pulses down to 100 fs.

According to one aspect of the present invention, the chirped QPM gratings are used as pulse stretching and/or compressing elements in an ultrashort-pulse chirped pulse amplification system.

FIG. 2a illustrates a CPA system according to a first embodiment of the present invention. As shown in FIG. 2a, an ultrashort pulse laser 10 generates ultrashort optical pulses which are received by a quasi-dispersive aperiodic QPM grating 12 operating as a pulse stretcher. The optical pulses stretched by the chirped QPM grating 12 are amplified in optical amplifier 14 and then recompressed by a conventional dispersive delay line (DDL) compressor 16. The chirped QPM grating 12 can be implemented in a periodically poled crystal of the KTP isomorph family, such as the above-mentioned PPLN crystal.

FIG. 2b illustrates a CPA system according to a second embodiment of the present invention. As shown in FIG. 2b, an ultrashort pulse laser 20 generates ultrashort optical pulses which are received and stretched by conventional DDL stretcher 22. The stretched optical pulses are then amplified in optical amplifier 24. Quasi-dispersive aperiodic QPM grating 26 operates as a pulse compressor and recompresses the amplified pulses.

Since the second harmonic pulses produced by chirped QPM gratings 12 (FIG. 2a) and 26 (FIG. 2b) have frequencies that differ from those of the fundamental harmonic input pulses, the systems shown in FIGS. 2a and 2b are useful only where frequency conversion is acceptable or required. The CPA system shown in FIG. 2a requires the pulse source 10 to operate at a longer wavelength than the gain spectrum of the amplifier 14, such that $\lambda_{pulse} = 2 \cdot \lambda_{gain}$, where $\lambda_{pulse}$ is the central wavelength of the pulse source and $\lambda_{gain}$ is the central wavelength of the amplifier gain. Examples of amplifiers suitable for the system shown in FIG. 2a include a fiber-oscillator injected Ti:sapphire or Alexandrite regenerative or multipass amplifiers. Er-doped mode-locked fiber oscillators produce femtosecond pulses at ~1550 nm, the second harmonic of which has a wavelength of ~777 nm, which is within the spectral bandwidth of the above solid-state gain media.

The configuration shown in FIG. 2b can be used when the gain bands of the pulse source 20 and the amplifier 24 must overlap. The output pulses, however, will be frequency-doubled with respect to the amplified fundamental signal due to the operation of the chirped QPM grating 26.

The systems of both the first and second embodiments exhibit increased overall efficiency when compared to conventional CPA schemes that have additional frequency conversion. This increased efficiency is attributable to the fact that losses typical for a conventional pulse stretcher or compressor are eliminated. Furthermore, higher available fundamental powers produce higher harmonic-conversion efficiency in the doubling element. This efficiency increase is particularly important for the system of the second embodiment shown in FIG. 2b, where the losses in the compression stage are final and are not compensated by an amplifier gain.

Figure 2C:
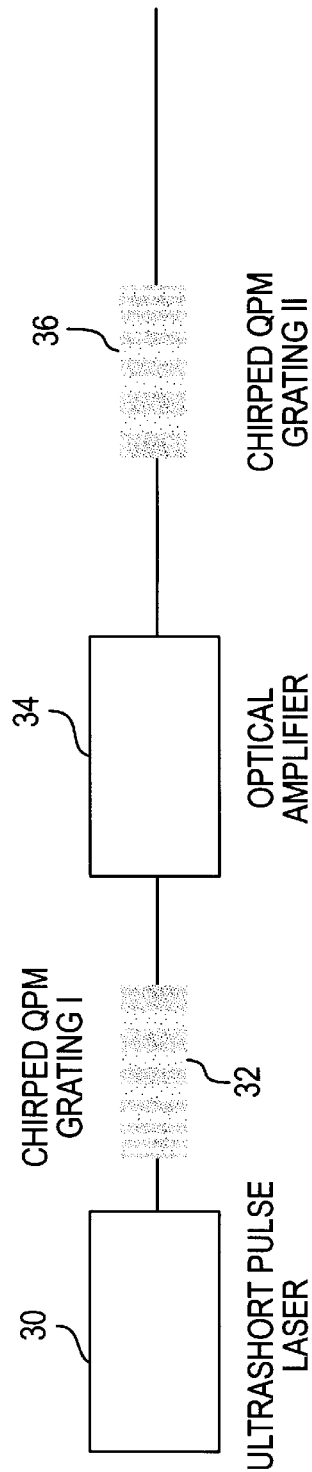
FIG. 2c is a diagrammatic view of an ultrashort-pulse chirped pulse amplification system including a first chirped QPM grating serving as a pulse stretcher and a second chirped QPM grating serving as a pulse compressor.

FIG. 2c illustrates another implementation of chirped QPM elements in a CPA system according to a third embodiment of the present invention. As shown in FIG. 2c, an ultrashort pulse laser 30 generates ultrashort optical pulses which are received by a quasi-dispersive aperiodic QPM grating 32 operating as a pulse stretcher. The optical pulses stretched by the chirped QPM grating 32 are amplified in optical amplifier 34. Quasi-dispersive aperiodic QPM grating 36 operates as a pulse compressor and recompresses the amplified pulses. Thus, both pulse stretching and compression are achieved with chirped QPM gratings. In the system according to the third embodiment, the amplified and recompressed output is at the fourth-harmonic wavelength with respect to the input pulse wavelength from the oscillator 30.

The advantages of these CPA configurations based on chirped QPM gratings include: a substantially reduced number of components, the reduced size of the system and increased robustness. These improvements cumulatively result in considerably simplified manufacturing, as well as reduced cost and increased reliability of such devices, relative to CPA systems based on conventional dispersive delay lines.

The duration of the stretched pulses determines the maximum energy that can be obtained with a CPA system. For a chirped QPM grating, the duration $\Delta T$ of a stretched pulse is determined by the length L of the grating and by the group velocity walk-off between fundamental and second-harmonic pulses $\delta$: $\Delta T = L\delta$. For example, in periodically poled lithium niobate (PPLN) $\delta$=300 fs/mm for 1560 nm fundamental wavelength. Therefore, for achieving $\Delta T$ of 100 ps and longer, tens of centimeters of chirped PPLN are required. Technological limitations on the size of a PPLN wafer can be overcome by cascading several chirped QPM gratings.

Figure 2D:
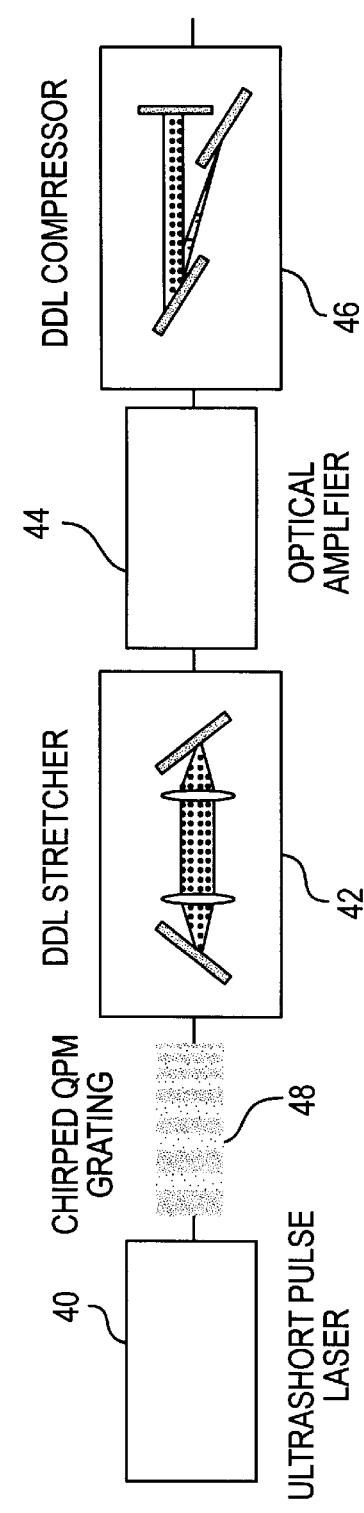
FIG. 2d is a diagrammatic view of an ultrashort-pulse chirped pulse amplification system including a conventional pulse stretcher, a conventional pulse compressor and a nonlinearly chirped QPM grating serving as a frequency converter and a nonlinear dispersion compensator.

FIG. 2d illustrates a further implementation using chirped QPM gratings in a CPA system according to a fourth embodiment of the present invention. As shown in FIG. 2d, an ultrashort pulse laser source 40 generates ultrashort optical pulses which are frequency doubled and partially stretched in an aperiodic QPM grating 48 and then received and stretched further by DDL stretcher 42. The pulse stretcher 42 comprises a conventional dispersive delay line, providing large stretched pulse duration. Examples of such stretchers known from the prior art include a length of a fiber or a diffraction grating stretcher.

The stretched optical pulses are amplified in optical amplifier 44 which can be, for example a multipass, a multistage or a regenerative amplifier. The amplified pulses are recompressed by a dispersive delay line (DDL) compressor 46. Preferably, pulse compressor 46 is a diffraction grating arrangement in order to avoid limitations on the pulse energy.

The advantage of this embodiment is the utilization of the capability to tailor the dispersion characteristics of a QPM grating to correct for first as well as higher order GVD terms. As explained above, unmatched higher order dispersion terms can arise either if different types of pulse stretcher and compressor are used, or if the large amount of linear GVD introduced by the material in an optical path of propagating pulses causes a dispersion mismatch between the same type of pulse stretchers and compressors. Also, the necessity to compensate for both linear and nonlinear GVD terms can arise due to the nonlinear optical effects arising at sufficiently high peak powers in an optical material. The same function of nonlinear-chirp correction can also be achieved by placing a nonlinearly chirped QPM grating after the pulse compressor.

The chirp profile of the QPM grating 48 must be tailored accordingly to achieve the required nonlinear-dispersion characteristics. It is advantageous to design the QPM grating such that the rate of QPM-period variation along the beam propagation direction is a function of the transversal position across the QPM crystal. This allows the adjustment of the QPM-grating effective dispersion by translating the crystal with respect to the optical beam in order to more precisely match the chirp of the fundamental pulse induced by GVD.

According to a fifth embodiment of the present invention, a chirped QPM. grating can be used to simultaneously compress and frequency double stretched (chirped) optical pulses output directly from a mode-locked oscillator.

Figure 3:
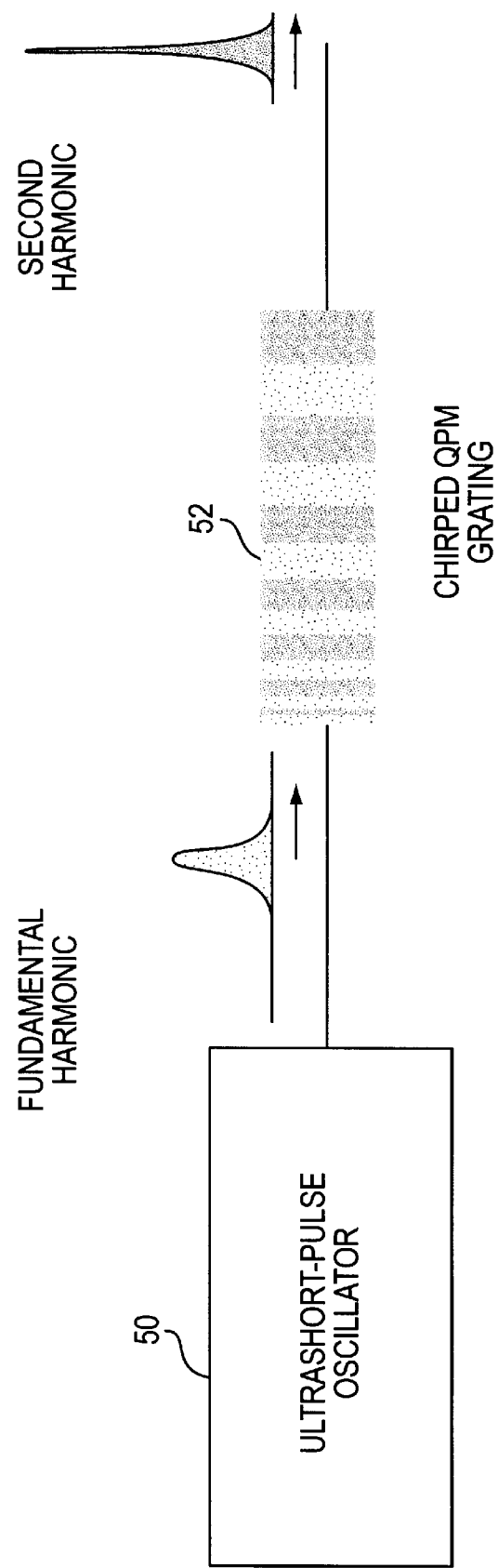
FIG. 3 is a diagrammatic view of an ultrashort pulse generating system comprising an ultrashort-pulse oscillator and a chirped QPM grating.

As shown in FIG. 3, an ultrashort-pulse oscillator 50, such as a mode-locked oscillator, can be set to produce stretched broad-bandwidth optical pulses by a proper combination of dispersive components in the cavity. Operation of the mode-locked laser 50 in this manner is advantageous, because it allows higher pulse energies to be achieved due to the lower peak powers inside the cavity.

As explained above, one disadvantage of conventional stretched-pulse lasers is that they require additional external dispersion compensation to compress output pulses down to the bandwidth-limited durations. Typically, this can be achieved using diffractive grating or refractive prism compressors. Use of a fiber for pulse compression is limited by nonlinear pulse distortions in a fiber at high peak powers.

Use of the chirped QPM grating 52 shown in FIG. 3 is an elegant solution eliminating bulk arrangements outside the laser cavity and substantially increasing overall efficiency of the pulse compression and frequency conversion. Additional advantage result from the possibility of compensating any nonlinear frequency-chirp components arising at the output of a mode-locked oscillator during stretched-pulse operation, due to nonlinear GVD and optical nonlinear effects in the cavity. Again, use of aperiodic QPM gratings is useful only where the second-harmonic output is acceptable or required.

According to a sixth embodiment of the present invention shown in FIG. 4, an aperiodic QPM grating 60 is employed to arbitrarily shape ultrashort optical pulses at the second-harmonic wavelength. The conditions for generating the required output second-harmonic pulse shape $A_2(t)$ for the given fundamental input pulse shape $A_1(t)$ are determined mathematically in the frequency domain using equation (1), where $\hat{A}_1^2(\Omega) = F\{A_2(t)\}$ and $\hat{A}_2(\Omega) = F\{A_1^2(t)\}$ are Fourier transforms of the temporal amplitude shapes of the output pulse and the input squared pulse, respectively. Nearly arbitrary second-harmonic pulse shaping is possible due to the technological possibility of forming an arbitrarily shaped QPM grating profile. The required longitudinal profile of a QPM grating d(z) relates to $\hat{D}(\Omega)$ through $$D(\Omega) = \Gamma \int_{-\infty}^{+\infty} \bar{d}(z) \exp(i[\Delta k_0 + \Omega \delta]z) dz \quad (3)$$

where $\Delta k_0 = 4\pi(n_2-n_1)\lambda_0$ is the k-vector mismatch defined for refractive indices $n_2$ and $n_1$, at second harmonic and fundamental wavelengths, respectively, and at the center wavelength of the input pulse $\lambda_0$. Non-linear coefficient d(z) is a function of longitudinal coordinate in the form of normalized nonlinearity $\bar{d}(z) = d(z)/d_{eff}$, where $d_{eff}$ is the maximum effective nonlinearity. The constant $\Gamma$ is defined as $\Gamma = -i\pi d_{eff}/\lambda_0 n_2$.

In general, an aperiodic QPM grating profile can produce both phase and amplitude modulation with respect to the second harmonic output. For a known input fundamental pulse and the required shape of an output second-harmonic pulse, the required longitudinal QPM profile d(z) of a nonlinearity coefficient can be explicitly calculated by taking the inverse Fourier transform of $$D(\Omega) = \frac{\hat{A}_2(\Omega)}{\hat{A}_1^2(\Omega)} \quad (4)$$

As shown in FIG. 4, an example of an apparatus generating arbitrarily shaped second-harmonic output pulses according to this aspect of the present invention comprises an optical pulse source 60, providing fundamental pulses of sufficient bandwidth for achieving the required output pulse shape, and an aperiodic QPM grating 62 with a predefined longitudinal profile of effective nonlinearity. The two-dimensionality of the QPM grating 62 can be exploited to write a variety of QPM profiles. Then, by translating such QPM structure with respect to the input beam (transversely), a variety of waveforms can be selected for generation with a single crystal. An even greater variety of arbitrary shaped waveforms can be obtained simply by using a multitude of different crystals.

Advantages of the system of the sixth embodiment of the present invention over conventional pulse shapers known in the prior art include the small size and the monolithic design of the pulse shaping QPM grating.

Although the invention has been described and shown in terms of preferred embodiments thereof, it will be understood by those skilled in the art that changes in form and detail may be made therein without departing from the spirit and scope of the invention as defined in the appended claims.

What is claimed is:

1. An ultrashort pulse amplification system, comprising:
   an ultrashort pulse source generating ultrashort pulses;
   a chirped quasi-phase-matched grating receiving, stretching and frequency converting the ultrashort pulses to thereby produce stretched pulses;
   an optical amplifier receiving and amplifying the stretched pulses to thereby produce amplified pulses; and
   a compressor receiving and compressing the amplified pulses to thereby produce compressed pulses.

2. The ultrashort pulse amplification system of claim 1, wherein said compressor is a dispersive delay line.

3. The ultrashort pulse amplification system of claim 1, wherein said compressor is another chirped quasi-phase-matched grating.

4. The ultrashort pulse amplification system of claim 3, wherein the ultrashort pulses are fundamental-wavelength pulses and the compressed pulses are fourth harmonic pulses with respect to the ultrashort pulses.

5. The ultrashort pulse amplification system of claim 1, wherein the ultrashort pulses are fundamental-wavelength pulses and said stretched pulses are second harmonic pulses with respect to the ultrashort pulses.

6. The ultrashort pulse amplification system of claim 1, wherein the chirped quasi-phase-matched grating is implemented in a periodically poled crystal of the KTP isomorph family.

7. The ultrashort pulse amplification system of claim 1, wherein said chirped quasi-phase-matched grating compensates for nonlinear chirp.

8. An ultrashort pulse amplification system, comprising:
   an ultrashort pulse source generating ultrashort pulses;
   a stretcher receiving and stretching the ultrashort pulses to thereby generate stretched pulses;
   an optical amplifier receiving and amplifying the stretched pulses to thereby produce amplified pulses; and
   a chirped quasi-phase-matched grating receiving, compressing and frequency converting the amplified pulses.

9. The ultrashort pulse amplification system of claim 8, wherein said stretcher is a dispersive delay line.

10. The ultrashort pulse amplification system of claim 8, wherein said stretcher is another chirped quasi-phase-matched grating.

11. The ultrashort pulse amplification system of claim 8, wherein the ultrashort pulses are fundamental-wavelength pulses and said compressed pulses are second harmonic pulses with respect to the ultrashort pulses.

12. The ultrashort pulse amplification system of claim 8, wherein the chirped quasi-phase-matched grating is implemented in a periodically poled crystal of the KTP isomorph family.

13. The ultrashort pulse amplification system of claim 8, wherein said chirped quasi-phase-matched grating compensates for nonlinear chirp.

14. An ultrashort pulse amplification system, comprising:
   an ultrashort pulse source generating ultrashort pulses;
   a chirped quasi-phase-matched grating receiving, partially stretching and frequency converting the ultrashort pulses to thereby produce frequency converted pulses;
   a stretcher receiving and further stretching the frequency converted pulses to thereby generate stretched pulses;
   an optical amplifier receiving and amplifying the stretched pulses to thereby produce amplified pulses; and
   a compressor receiving and compressing the amplified pulses to thereby produce compressed pulses.

15. The ultrashort pulse amplification system of claim 14, wherein said stretcher and said compressor are dispersive delay lines.

16. The ultrashort pulse amplification system of claim 14, wherein the ultrashort pulses are fundamental-wavelength pulses and said frequency converted pulses are second harmonic pulses with respect to the ultrashort pulses.

17. The ultrashort pulse amplification system of claim 14, wherein the chirped quasi-phase-matched grating is implemented in a periodically poled crystal of the KTP isomorph family.

18. The ultrashort pulse amplification system of claim 14, wherein said chirped quasi-phase-matched grating compensates for nonlinear chirp.

19. An ultrashort pulse compression system, comprising:
   an ultrashort pulse source generating chirped ultrashort pulses; and
   a chirped quasi-phase-matched grating receiving, compressing and frequency converting the ultrashort pulses.

20. The ultrashort pulse amplification system of claim 19, wherein the chirped ultrashort pulses are fundamental-wavelength pulses and said compressed pulses are second harmonic pulses with respect to the ultrashort pulses.

21. The ultrashort pulse amplification system of claim 19, wherein the ultrashort pulse source comprises a mode-locked oscillator.

22. The ultrashort pulse amplification system of claim 19, wherein said chirped quasi-phase-matched grating compensates for nonlinear chirp.

23. The ultrashort pulse amplification system of claim 19, wherein said chirped quasi-phase-matched grating is implemented in a periodically poled crystal of the KTP isomorph family.

24. An ultrashort pulse shaping system, comprising:
   an ultrashort pulse source generating ultrashort pulses; and
   an aperiodic quasi-phase-matched grating receiving said ultrashort pulses and producing an ultrashort optical pulse having a nearly arbitrary pulse shape and phase at a second harmonic wavelength.

25. The ultrashort pulse shaping system of claim 24, further comprising a plurality of aperiodic quasi-phasematched gratings including said aperiodic quasi-phase-matched grating, wherein each of said plurality of aperiodic quasi-phase-matched gratings is formed along a longitudinal direction of a crystal at a different traverse location.

26. The ultrashort pulse shaping system of claim 24, further comprising a plurality of nonlinear crystals, at least one aperiodic quasi-phase-matched grating being formed in each of said crystals.

27. The ultrashort pulse shaping system of claim 24, wherein said aperiodic quasi-phase-matched grating is implemented in a periodically poled crystal of the KTP isomorph family.

28. An ultrashort pulse amplification system, comprising:
an ultrashort pulse source generating ultrashort pulses;
a pulse stretcher optically connected to said ultrashort pulse source and configured to stretch the ultrashort pulses to thereby generate stretched pulses;
an optical amplifier optically connected to said pulse stretcher and configured to amplify the stretched pulses to thereby produce amplified pulses; and
a pulse compressor optically connected to said optical amplifier and configured to compress the amplified pulses to thereby produce compressed pulses;
wherein at least one of said pulse stretcher and said pulse compressor comprises a chirped quasi-phase-matched grating.

29. The ultrashort pulse amplification system of claim 28, wherein a frequency of the stretched pulses is a second harmonic of a frequency of the ultrashort pulses.

30. The ultrashort pulse amplification system of claim 28, wherein a frequency of the compressed pulses is a second harmonic of a frequency of the ultrashort pulses.

31. The ultrashort pulse amplification system of claim 28, wherein a frequency of the compressed pulses is a fourth harmonic of a frequency of the ultrashort pulses.

32. The ultrashort pulse amplification system of claim 28, wherein the chirped quasi-phase-matched grating is implemented in a periodically poled crystal of the KTP isomorph family.

33. The ultrashort pulse amplification system according to claim 28, wherein a chirp profile of said chirped quasi-phase-matched grating in a direction of pulse propagation is tailored to compensate for nonlinear dispersion.

34. The ultrashort pulse amplification system according to claim 28, wherein said chirped quasi-phase-matched grating is formed in a crystal, wherein a rate of quasi-phase-matched-period variation along a direction of pulse propagation varies in a transverse direction within said crystal to provide different nonlinear dispersion characteristics at different transverse locations along said crystal.

35. An ultrashort pulse amplification system, comprising:
an ultrashort pulse source generating ultrashort pulses;
means for stretching the ultrashort pulses to thereby generate stretched pulses;
an optical amplifier receiving and amplifying the stretched pulses to thereby produce amplified pulses; and
means for compressing the amplified pulses to thereby produce compressed pulses;
wherein at least one of said means for stretching and said means for compressing comprises a chirped quasi-phase-matched grating.

36. The ultrashort pulse amplification system of claim 35, wherein a frequency of the stretched pulses is a second harmonic of a frequency of the ultrashort pulses.

37. The ultrashort pulse amplification system of claim 35, wherein a frequency of the compressed pulses is a second harmonic of a frequency of the ultrashort pulses.

38. The ultrashort pulse amplification system of claim 35, wherein a frequency of the compressed pulses is a fourth harmonic of a frequency of the ultrashort pulses.

39. The ultrashort pulse amplification system of claim 35, wherein the chirped quasi-phase-matched grating is implemented in a periodically poled crystal of the KTP isomorph family.

40. The ultrashort pulse amplification system according to claim 35, wherein a chirp profile of said chirped quasi-phase-matched grating in a direction of pulse propagation is tailored to compensate for nonlinear dispersion.

41. The ultrashort pulse amplification system according to claim 35, wherein said chirped quasi-phase-matched grating is formed in a crystal, wherein a rate of quasi-phase-matched-period variation along a direction of pulse propagation varies in a transverse direction within said crystal to provide different nonlinear dispersion characteristics at different transverse locations along said crystal.

42. A method of amplifying an ultrashort optical pulse, comprising the steps of:
stretching the ultrashort optical pulse to create a stretched pulse;
amplifying the stretched pulse to create an amplified pulse; and
compressing the amplified pulse;
wherein at least one of said stretching and compressing steps is accomplished using a chirped quasi-phase-matched grating.

43. The method according to claim 42, further comprising the step of frequency converting said ultrashort optical pulse, said frequency converting step occurring simultaneously with said stretching step and being accomplished using said quasi-phase-matched grating.

44. The method according to claim 42, further comprising the step of frequency converting said amplified pulse, said frequency converting step occurring simultaneously with said compressing step and being accomplished using said quasi-phase-matched grating.

45. The method according to claim 42, further comprising the step of tailoring a chirp profile of the chirped quasi-phase-matched grating in a direction of pulse propagation to compensate for nonlinear dispersion.

46. The method according to claim 42, further comprising the step of forming the chirped quasi-phase-matched grating in a crystal, such that a rate of quasi-phase-matched-period variation along a direction of pulse propagation varies in a transverse direction within the crystal to provide different nonlinear dispersion characteristics at different transverse locations in the crystal.

* * * * *

UNITED STATES PATENT AND TRADEMARK OFFICE
CERTIFICATE OF CORRECTION

PATENT NO. : 5,867,304 Page 1 of 1
DATED : February 2, 1999
INVENTOR(S) : Almantas Galvanauskas et al.

It is certified that error appears in the above-identified patent and that said Letters Patent is hereby corrected as shown below:

<u>Title page,</u>
Item [73], Assignee, should read -- IMRA America, Inc., Ann Arbor, Michigan and Leland Stanford Junior University, Stanford, California --

Signed and Sealed this

Eighteenth Day of February, 2003

JAMES E. ROGAN
*Director of the United States Patent and Trademark Office*

UNITED STATES PATENT AND TRADEMARK OFFICE
CERTIFICATE OF CORRECTION

Page 1 of 1

PATENT NO. : 5,867,304
APPLICATION NO. : 08/845410
DATED : February 2, 1999
INVENTOR(S) : Galvanauskas et al.

It is certified that error appears in the above-identified patent and that said Letters Patent is hereby corrected as shown below:

Column 1:

• Please replace lines 5-9 with:

-- FEDERALLY-SPONSORED RESEARCH OR DEVELOPMENT
This invention was made with Government support under contracts N00014-92-J-1903 and N00014-90-J-1050 awarded by the Department of the Navy ONR. The Government has certain rights in this invention. --

Signed and Sealed this
Twenty-sixth Day of April, 2011

David J. Kappos
*Director of the United States Patent and Trademark Office*